United States Patent [19]

Kilstofte

[11] Patent Number: 4,649,562
[45] Date of Patent: Mar. 10, 1987

[54] DRIVE MECHANISM FOR A TWO-TAPE TELEPHONE ANSWERING MACHINE USING A SINGLE REVERSIBLE MOTOR

[75] Inventor: Richard B. Kilstofte, Long Beach, Calif.

[73] Assignee: Fortel, Inc., Compton, Calif.

[21] Appl. No.: 670,212

[22] Filed: Nov. 13, 1984

[51] Int. Cl.$^4$ ............................................. H04M 1/64
[52] U.S. Cl. ..................................................... 379/70
[58] Field of Search .................... 179/6.03, 6.13, 6.16; 360/91, 963, 96.4

[56] References Cited

U.S. PATENT DOCUMENTS

| 4,385,205 | 5/1983 | Jacobson | 179/6.03 |
| 4,390,752 | 6/1983 | Jacobson | 179/6.16 |
| 4,419,702 | 12/1983 | Tanaka | 360/96.4 |
| 4,528,606 | 7/1985 | Tsuchiya | 360/96.3 |

Primary Examiner—Raymond F. Cardillo
Assistant Examiner—James E. Tomassini
Attorney, Agent, or Firm—Keith D. Beecher

[57] ABSTRACT

A mechanism for controlling the magnetic tape units of a telephone answering machine of the type which utilizes a continuous loop cassette magnetic tape unit on which an announcement message is recorded for transmission to a calling party during an initial time interval ($T_1$), and which also includes a C-60 type cassette magnetic tape unit in which the tape is drawn from a supply reel to a take-up reel in order to record the message from the calling party during a subsequent message recording interval ($T_2$). In the mechanism of the invention, a single reversible electric motor and a centrifugal gear drive are used to drive the announcement tape unit when the motor turns in one direction and to drive the message tape unit when the motor turns in the opposite direction. A simple manual control allows the message tape unit to be driven at increased speed in the forward direction during a fastforward operation and at the increased speed in the reverse direction during a rewind operation.

4 Claims, 4 Drawing Figures

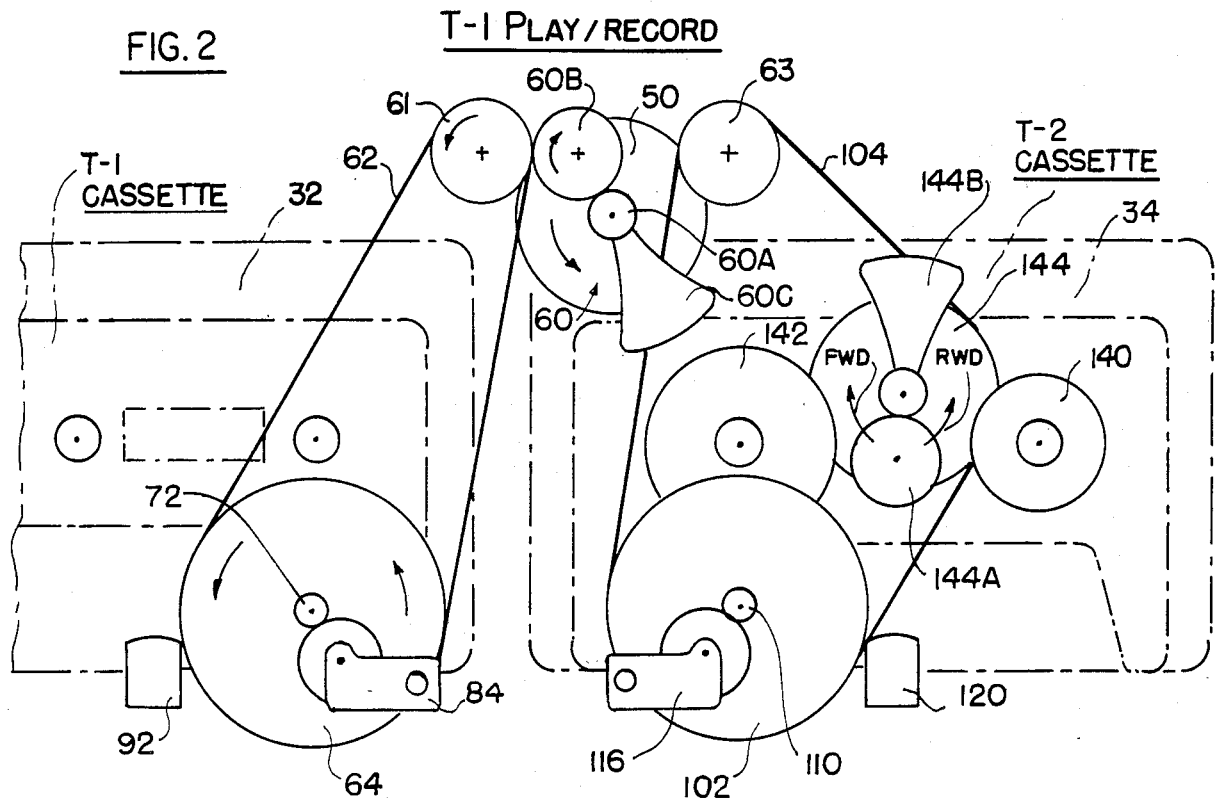
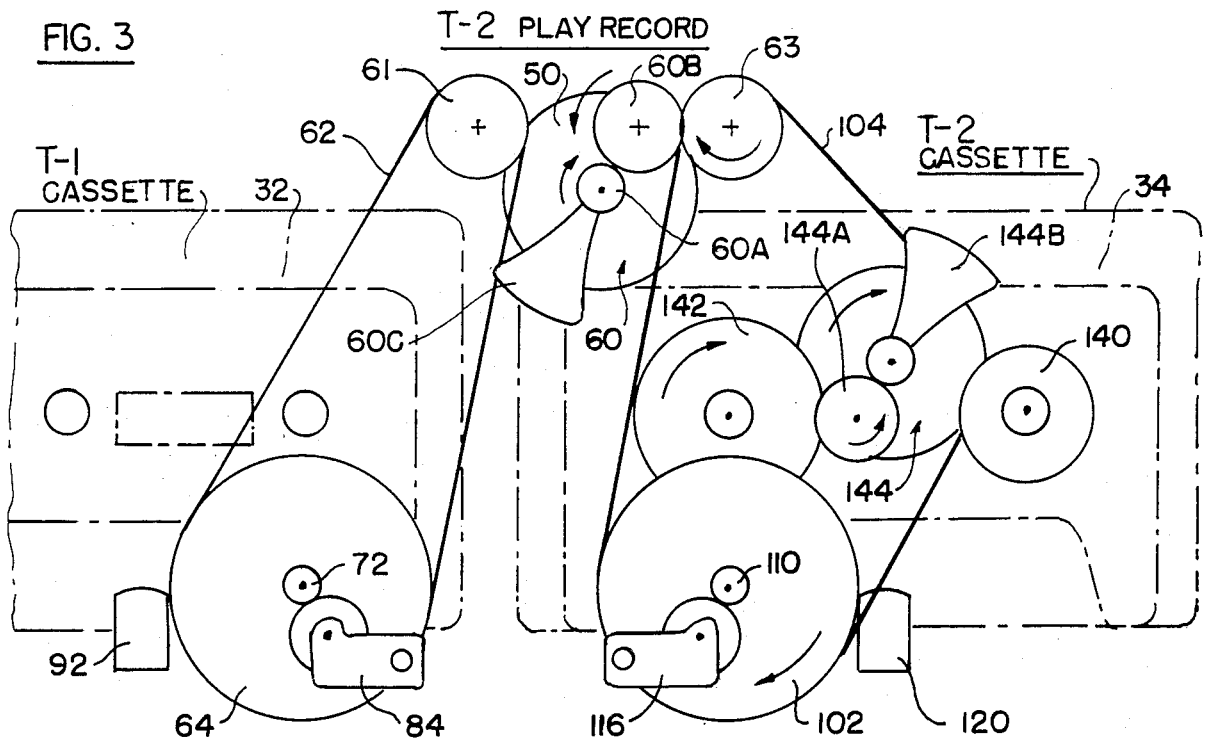

DRIVE MECHANISM FOR A TWO-TAPE TELEPHONE ANSWERING MACHINE USING A SINGLE REVERSIBLE MOTOR

BACKGROUND OF THE INVENTION

Telephone answering machines in general are well known in the prior art. Such machines respond to an incoming telephone ring signal to cause a recorded announcement to be sent over the telephone line to a calling party during a first time interval ($T_1$), and then automatically to enter a message recording mode during a second time interval ($T_2$) during which the message from the calling party is recorded. The recorded announcement is usually contained on a continuous loop magnetic tape cassette, and the messages from the calling parties are usually recorded on a magnetic tape in a C-60 type cassette which is drawn from a supply reel to a take-up reel.

The mechanism of the present invention which controls the two magnetic tape units is similar in some respects to the mechanism described in U.S. Pat. No. 3,968,329 which is assigned to the present assignee. However, in the mechanism of the present invention a single reversible motor and a centrifugal clutch are used to drive both the announcement and message tape units, the motor being rotated in one direction to drive the announcement tape unit and in the opposite direction to drive the message tape unit.

BRIEF DESCRIPTION OF THE DRAWINGS

FIGS. 2, 3 and 4 are representations of one embodiment of the tape control mechanism of the invention in its various operational modes.

DETAILED DESCRIPTION OF THE ILLUSTRATED EMBODIMENT

Figure 4:
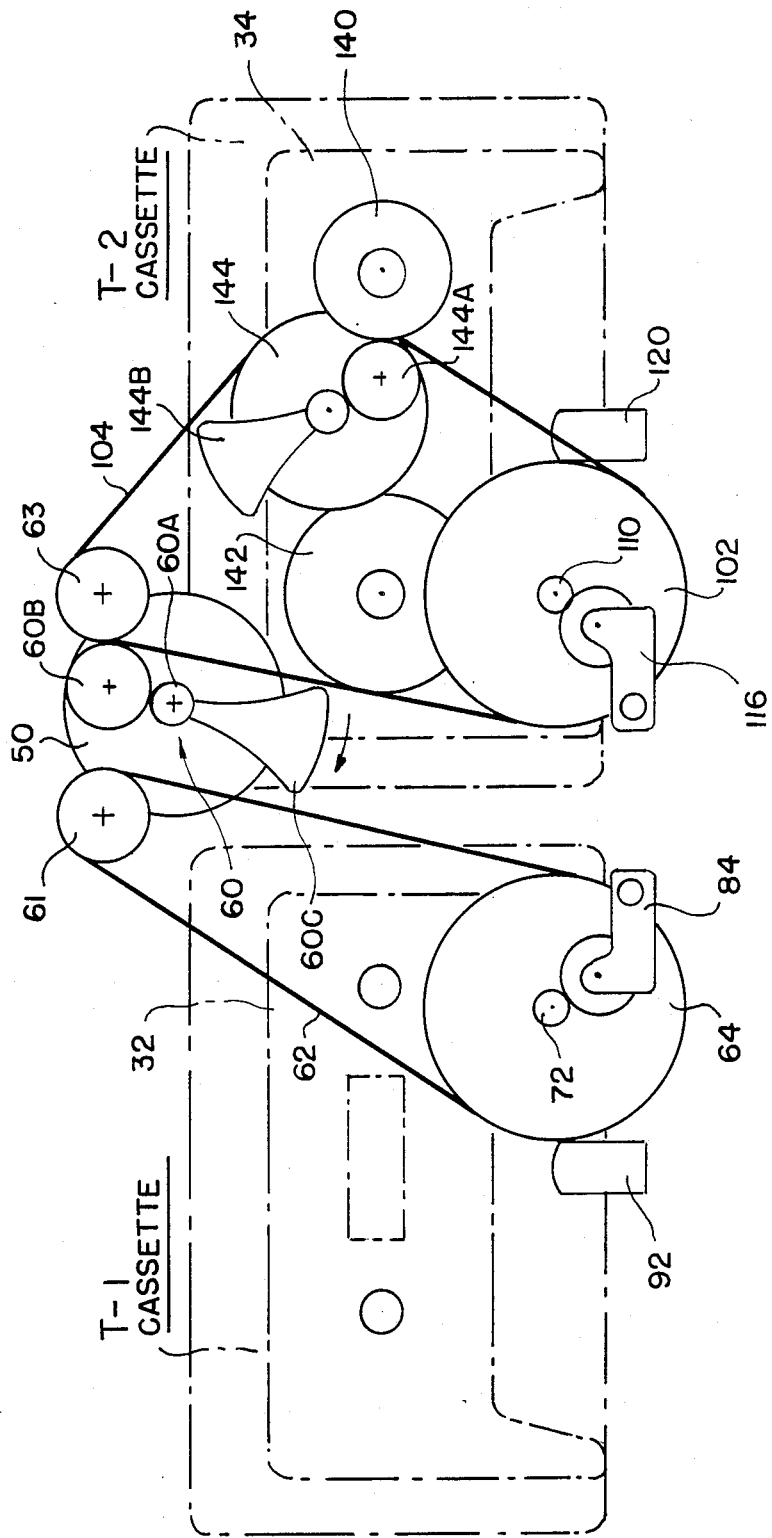

The telephone answering machine illustrated in the drawings includes a pair of cassette tape units designated 32 and 34 (FIGS. 2–4). The cassette tape unit 32 (T-1) contains a loop of magnetic tape on which an announcement is recorded which is transmitted to a calling party during the first time interval ($T_1$) after a call is received. The cassette tape unit 34 (T-2) contains a magnetic tape which is drawn from a supply reel to a take-up reel to record messages from calling parties which are received during subsequent time intervals ($T_2$).

As shown in the drawings, the telephone answering machine includes an electric motor 50 which may, for example, be any suitable reversible direct current motor. Motor 50 is mounted on the deck 52 of the machine. A first centrifugal clutch 60 is mounted on the drive shaft of motor 50, and the clutch includes a drive gear 60A which is keyed to the shaft, an idler gear 60B and a weight 60C which is mounted on the clutch diametrically opposite to gear 60B.

A pulley 61 is rotatably mounted on the underside of deck 52, and the pulley is coupled through a rubber belt 62 to a flywheel 64. Flywheel 64 is rotatably mounted on the underside of deck 52. A drive capstan 72 for the announcement tape extends upwardly from the flywheel 64 along the axis of rotation of the flywheel and through the deck 52. The capstan is rotatably driven by the flywheel.

Figure 1:
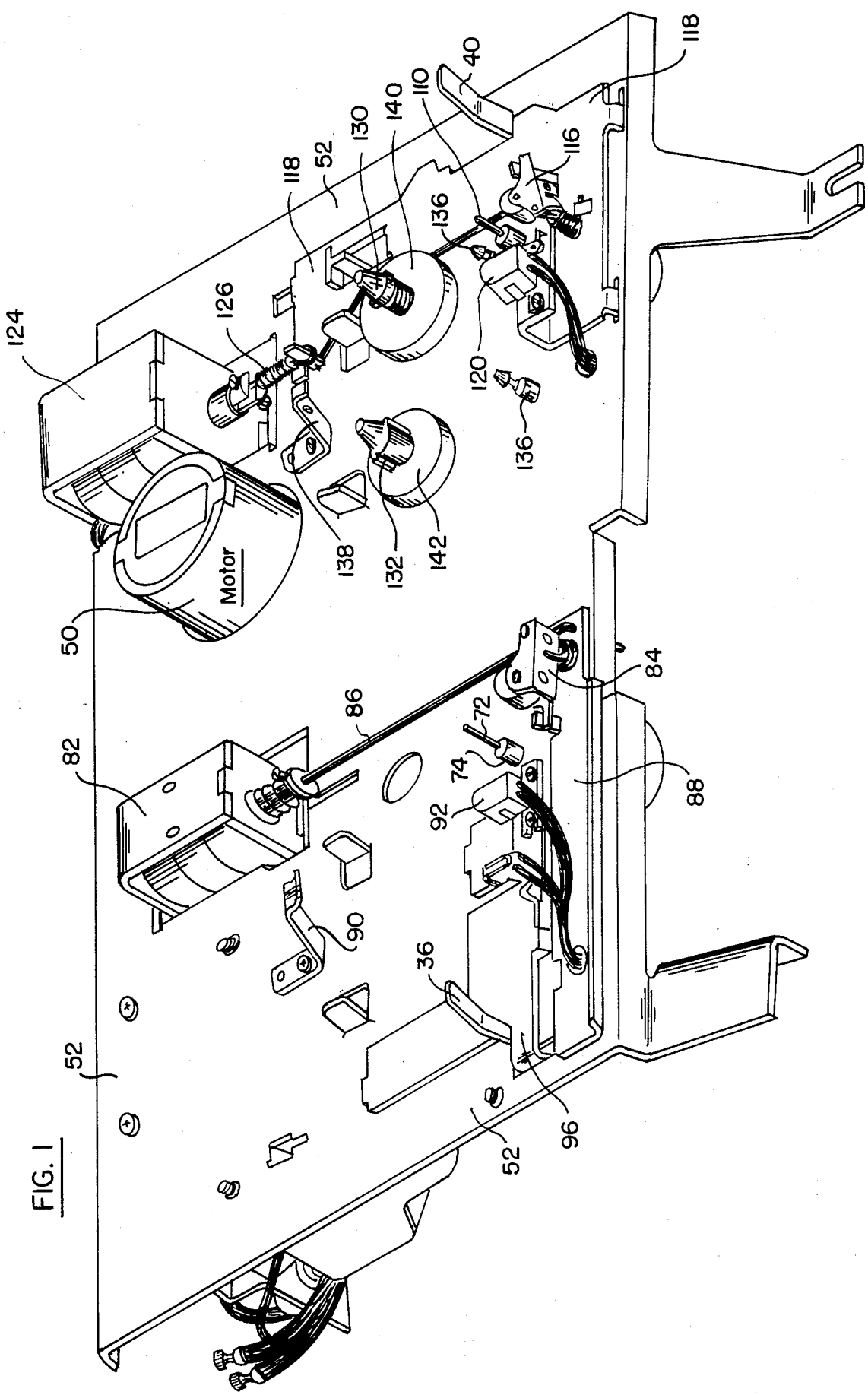
FIG. 1 is a perspective representation of the deck of a typical telephone answering machine, and of various components which are supported on the deck and which make up the mechanism for controlling the magnetic tape units of the machine.

As shown in FIG. 1, a solenoid 82 is mounted on deck 52, and the solenoid is mechanically coupled to a pinch roller assembly 84 through a pull rod 86. The pinch roller assembly 84 is mounted on a movable plate 88 which is normally biased to a standby position. When the solenoid 82 is energized, the pull rod 86 pulls the plate 88 and the pinch roller assembly 84 into an operative position to pinch the announcement tape T-1 in cassette 32 against the drive capstan 72. In this way, the announcement tape is driven whenever the solenoid 82 is operated.

It is to be understood, of course, that the deck mechanism described above, and in the following description, by which the T-1 and T-2 magnetic tapes are each selectively placed in an active condition, represents but one type of such mechanism, and other known mechanisms may be used.

The announcement cassette 32 is held in place on deck 52 by means of a hold-down clip 90, with its magnetic tape engaging an electromagnetic transducer head 92, head 92 being mounted on a spring-biased head plate 96, so that the head engages the announcement tape when the tape is driven by the drive capstan 72. As mentioned above, the announcement tape is in the form of a loop, and each time the solenoid 82 is energized the announcement tape is caused to run through its complete loop.

A pulley 100 is rotatably mounted on the underside of deck 52, and the pulley is coupled to a flywheel 102 through a second rubber belt 104. The flywheel 102 is also rotatably mounted on the underside of deck 52. Flywheel 102 drives a capstan 110 which extends along the axis of rotation of the flywheel up through deck 52. Capstan 110 is used to drive the message tape in cassette 34.

A pinch roller assembly 116 is mounted on a springbiased plate 118, and an electromagnetic transducer head 120 is also mounted on the plate. The pinch roller 116 is normally spaced from the drive capstan 110 until a solenoid 124 is energized. The solenoid 124 is coupled to plate 118 through a spring 126. When the solenoid is energized it pulls the plate to the left in FIG. 1 to cause the pinch roller 116 to pinch the T-2 message tape in the cassette 34 against the drive capstan 110, so that the message tape is drawn from the supply reel to the take-up reel in cassette 34. At the same time, the electromagnetic transducer head 120 is moved against the message tape for recording or playing back messages on the tape.

A drive spindle 130 for the supply reel in cassette 34 is rotatably mounted on deck 52, as is a spindle 132 for the take-up reel. When the message cassette 34 is inserted into the machine, spindle 130 engages the supply reel in the cassette and spindle 132 engages the take-up reel. The cassette is held in place by positioning pins 136, and by a hold-down clip 138. A drive gear 140 is mounted coaxially with the supply spindle 130, and a corresponding drive gear 142 is mounted coaxial with the take-up spindle 132. A second centrifugal clutch 144 is mounted between the drive gears 140 and 142, as shown in FIGS. 2–4. The centrifugal clutch 144 includes an idler roller 144A and a weight 144B.

When the motor 50 is driven in a first direction, the mechanism assumes the operational mode shown in FIG. 2 in which the gear 60B is moved against gear 61 due to the action of centrifugal weight 60C, so that the drive gear 60A of motor 50 drives the announcement tape. This operational mode occurs, for example, during the $T_1$ interval of the machine during which the announcement on the announcement tape is transmitted over the telephone line to a calling party. This operational mode may also occur when a new announcement is being recorded on the announcement tape.

During the operational mode shown in FIG. 2, the drive motor 50 is decoupled from the message cassette 34.

During the next time interval $T_2$ when a message from the calling party is being recorded in the message cassette 34, motor 50 is reversed. This causes the centrifugal weight 60C to move the gear 60B into engagement with gear 63, so that the drive belt 104 drives flywheel 102 and the message tape capstan 110. When that occurs, the gear 144A of centrifugal clutch 144 moves with centrifugal weight 144B due to the action of drive gear 60A acting on gear 60B, so that gear 144A meshes with gear 142 to drive the take-up reel of the message cassette 34. The weight 144B serves to balance the action so that the clutch functions smoothly.

Accordingly, during the $T_2$ interval, the mechanism assumes the operational mode shown in FIG. 3, so that the message tape may be drawn past electromagnetic transducer head 120 to record incoming messages. The mechanism also assumes the operational mode shown in FIG. 3 during the playback mode, when messages previously recorded on the message tape are played back to the user.

When the lever 40 of FIG. 1 is operated while the mechanism is in the mode of FIG. 3, the pinch roller 116 is drawn away from the capstan 110, so that the capstan no longer drives the message tape. The supply reel 142 is now driven at increased speed for a fast forward operation.

To rewind the message tape at the increased speed, the motor is again rotated in the direction of the operational mode shown in FIG. 2. However, as shown in FIG. 4, the coupler 60 is manually turned against the action of weight 60C so that the gear 60B engages gear 63. The resulting rotation of centrifugal coupler 144 causes gear 144A to engage gear 140 and to drive the supply reel of cassette 34 in the opposite direction to rewind the T-2 message tape.

The weight 60C may be moved manually to achieve the rewind operation by any appropriate mechanical linkage, as illustrated schematically in FIG. 4 by the arrow adjacent to weight 60C.

The invention provides, therefore, a simplified drive mechanism for the announcement and message cassettes in a telephone answering machine, by which a single reversible motor, and relatively simple components are used to effectuate all the necessary drive and control operations for the cassettes.

It will be appreciated that while a particular embodiment of the invention has been shown and described, modifications may be made. It is intended in the claims to cover all modifications which come within the spirit and scope of the invention.

I claim:

1. In a telephone answering machine which includes: a first magnetic tape unit on which an announcement is recorded for transmission to a calling party, first drive means mechanically coupled to the first magnetic tape unit, a second magnetic tape unit on which a message from the calling party is recorded, a second drive means mechanically coupled to the second magnetic tape unit, the combination of: a reversible drive motor having a drive shaft; and a centrifugal clutch mounted on the drive shaft of the motor to be driven thereby, said clutch automatically coupling said motor to said first drive means when said motor rotates in a first direction and to said second drive means when said motor rotates in the opposite direction, said clutch including a drive gear keyed to the drive shaft of the motor, an idler gear rotatable about an axis displaced from the axis of the drive shaft and coupled to the drive gear, said clutch functioning to move the idler gear into coupling relationship with the first drive means when the motor rotates in said first direction and into coupling relationship with the second drive means when the motor rotates in said opposite direction.

2. The combination defined in claim 1, in which said second magnetic tape unit includes a magnetic tape and take-up and supply reels for the magnetic tape, and said second drive means includes further clutch means for coupling said motor to said take-up reel when the motor is rotating in said first direction and to said supply reel when said motor is rotating in said opposite direction.

3. The combination defined in claim 1, in which said further clutch means includes a drive gear rotatably driven about a particular axis by the drive motor, an idler gear rotatable about an axis displaced from the axis of rotation of said drive gear and coupled to said drive gear, and a weight mounted to respond to said centrifugal force to cause said last-named idler gear to be coupled to the take-up reel of said second magnetic tape unit when the motor is rotating in said first direction and to said supply reel when said motor is rotating in said opposite direction.

4. The combination defined in claim 1, and which includes manually operable means for causing said clutch to disengage from said first drive means and to engage said second drive means when said motor is rotating in said first direction.

* * * * *